United States Patent
Kadah

(10) Patent No.: US 6,710,573 B2
(45) Date of Patent: Mar. 23, 2004

(54) METHOD OF CONTROLLING PULSED AC POWER

(76) Inventor: Andrew S. Kadah, 5000 Hennaberry Rd., Manlius, NY (US) 13104

( * ) Notice: Subject to any disclaimer, the term of this patent is extended or adjusted under 35 U.S.C. 154(b) by 72 days.

(21) Appl. No.: 10/091,190

(22) Filed: Mar. 6, 2002

(65) Prior Publication Data
US 2003/0169013 A1 Sep. 11, 2003

(51) Int. Cl.⁷ .............................. H02P 1/42; H02P 3/18; H02P 5/28
(52) U.S. Cl. .................. 318/727; 318/254; 318/700; 318/800; 318/801; 318/822; 318/757; 318/268
(58) Field of Search .................. 318/254, 432, 318/434, 700, 727, 800, 801, 822, 757, 268

(56) References Cited

U.S. PATENT DOCUMENTS

| | | | |
|---|---|---|---|
| 4,480,218 A | * | 10/1984 | Hair .......................... 318/696 |
| 4,926,104 A | * | 5/1990 | King et al. .................. 318/599 |
| 5,488,281 A | * | 1/1996 | Unsworth et al. .......... 318/806 |
| 5,548,197 A | * | 8/1996 | Unsworth et al. .......... 318/757 |
| 5,637,976 A | * | 6/1997 | Chen et al. .................. 318/809 |
| 6,046,554 A | * | 4/2000 | Becerra ....................... 318/254 |
| 6,118,239 A |   | 9/2000 | Kadah ......................... 318/268 |
| 6,339,309 B1 | * | 1/2002 | Bixel et al. .................. 318/727 |

* cited by examiner

Primary Examiner—Robert Nappi
Assistant Examiner—Tyrone Smith
(74) Attorney, Agent, or Firm—Bernhard P. Molldrem, Jr.

(57) ABSTRACT

PWM AC power is supplied to an induction motor or other AC load. The frequency and magnitude of the waveforms is controlled by detecting the peak voltage or width of the reverse EMF pulses at the commencement of the power waveform applied to the load, and then adjusting the applied AC power based on the detected peak voltage or width. Alternatively, the depth of width of a notch that follows the reverse EMF pulse can be detected and used to control the applied AC power.

8 Claims, 4 Drawing Sheets

METHOD OF CONTROLLING PULSED AC POWER

BACKGROUND OF THE INVENTION

The present invention relates to drive circuits that provide AC power (or in some cases DC power) to a motor armature or other AC load or to a reversing load, and is more particularly directed to a control circuit that provides AC power at a frequency, wave shape, and power factor that is tailored for an AC or inductive load that may vary during use, such as a single-phase AC induction motor, an example of which is a motor used to drive a compressor or blower in a HVAC application. The invention is more specifically concerned with a control circuit for applying drive power to a motor which may be from fractional horsepower to several horsepower or above in size; in which a torsional load varies depending upon external factors, and in which the motor torque can depend on the condition or quality of the AC line power; and in which the applied line voltage can drop from a nominal 117 volts (RMS) to below 100 volts, in which the power factor or phase angle can be significant; and in which the line frequency may drop well below the nominal 60 Hz (e.g., where the power is locally generated). Such drive power control circuits may have numerous industrial, commercial, and domestic applications.

In refrigeration and HVAC systems, it is often necessary to change the fan speed, blower speed or compressor speed to satisfy changing environmental conditions. For example, because cold, dry air is considerably heavier than warm moist air, during initial operation the blower has to operate at high speed to pump conditioned air, especially to higher floors. Then, when the comfort space or living space has cooled down, the fan speed is reduced to avoid blowing cold air directly on human occupants. Also, where sensible cooling is needed, rather than latent cooling the blower is operated at higher speed to increase air flow. Correspondingly, if dehumidification is required more than sensible cooling, the air flow rate should be reduced, requiring a slower blower speed. Likewise, as the demand for cooling changes, the need for liquid refrigerant through the system will also vary, and so compressor speed may need to be increased at times and reduced at other times.

Also, during many peak demand times, the quality of the AC line power can vary enormously, with changes in line voltage and line frequency. Typically, the motor designer is forced to over-design the motor in order to satisfy load requirements over an expected range of input conditions. The motor armature, which is basically an inductive load, may have to face an unfavorable power factor, which means that the actual applied voltage, i.e., the real component of the complex AC voltage, may become unacceptably low. Consequently, it is desirable to be able to adjust the shape and RMS value of the line voltage so that the motor will operate optimally, even under adverse line conditions.

It is well known that for an AC induction motor, the output torque is proportional to the square of the input voltage. It is also the practice for any given application to use a motor that is rated over a given voltage range of ±10%. This means that the system has to be over-designed to meet full load requirements at low voltage. Otherwise, for a given AC induction motor, if the input voltage is 10% low, i.e., $V=90\%$ $V_{normal}$, then output torque T drops to $T=81\%$ $T_{normal}$. This means that, according to conventional practice, the motor has to be over-designed by at least 19%. Consequently, at normal or high line conditions, over 20% of the electric energy is wasted.

One approach to motor control, which was intended for create control over motor speed, has been an adjustable speed drive (ASD) employing a pulse-controlled inverter. In these ASD's the incoming AC power is rectified to produce a constant DC level, and that is converted to an AC drive wave using pulse-width modulation (PWM). These ASD's overcome the shortcomings of operating induction motors directly on line voltage, and satisfy many of the requirements for speed control.

In many cases, what is needed is simply to boost (or to regulate) the effective RMS voltage. This can permit a smaller-rated motor to be used, than would be recommended where unmodified line power is applied directly to the motor.

Also, previous efforts in brownout protection (i.e., to protect the AC induction motor from burn out in low line voltage situations) have taken the approach of cutting off power to the motor to prevent damage. While this saves the motor, it can cause severe problems for the system that the motor is designed to drive. For example, in a commercial refrigeration application, a freezer system can be used for storage of a frozen food product, e.g., frozen meat, ice cream, or another food product. During a so-called brownout, when the operating line voltage drops below a safe threshold (e.g., reduced from 120 volts RMS to below 95 volts RMS) then the compressor motor is simply shut off, and no refrigeration takes place. If the brownout lasts for a period of an hour or more, the meat may begin to spoil, or the ice cream may melt. It would be more desirable to continue to operate the refrigeration system during brownouts, i.e., by modifying the AC power wave so that it is sufficient to run the equipment, even if at a partial speed. However, that has not been possible with existing power control circuits.

OBJECTS AND SUMMARY OF THE INVENTION

It is an object of this invention to provide power to an AC load, such as a motor armature, and to regulate and control the drive waveshape and frequency in a way that avoids the drawbacks of the prior art, as mentioned above.

It is an object of this invention to optimize applied power to avoid waste of electrical energy.

It is another object to provide a motor speed control for efficient operation of a compressor motor, blower motor, or other non-linear or reactive load.

It is a further object to provide a motor speed control that is reliable and efficient, and which can accommodate changes in load and changes in line power quality.

If is a yet further object of this invention to detect or measure dynamically the speed of the rotor, and to adjust the power level to match load requirements accordingly.

It is a still further object of this invention to expand the voltage operating range of existing or new equipment above and below the nominal frequency and voltage of the AC line.

If is a further object of this invention to optimize the voltage-to-frequency ratio of an AC induction machine or motor to enhance system efficiency by dynamically sensing rotor slip, monitoring motor current or back EMF amplitude and/or duration, and adjusting power levels accordingly to match load requirements, for both linear and non-linear loads.

It is still another object of this invention to provide a circuit of low-component count, low-loss, and low-cost design.

According to one aspect of the invention, a power controller for powering an AC single phase induction motor, three-phase induction motor, or other AC load (or in some cases a DC motor) employs input conductors that connect with a source of AC line power, the line power having a waveform and a line frequency, and output conductors that connect to an AC load, such as an induction motor. A variable drive circuit receives the line power from the input conductors and delivers properly conditioned AC power via output conductors to the AC load. The variable drive circuit can be any convenient drive circuit, such as PWM (pulse width modulated) and can be, e.g., of a full bridge or half-bridge design. The principles of this invention can also be embodied in a single-MOSFET switched bridge circuit, in which the armature of the AC induction motor (or other load) is connected in series with the AC inputs of a diode bridge, and which can be realized in single-phase or polyphase modes. The pulse frequency and amplitude can both the controlled, so that the power that is applied to the load at a has a magnitude and frequency that is optimal for the system demands and load conditions. These can be higher than, the same as, or lower than the line voltage and frequency. The variable drive circuit can employ a control circuit that has sensor inputs coupled to the load for monitoring and controlling the waveform and frequency of the power applied to the load. As explained later, the load itself serves the sensor, i.e., detecting the amount of rotor slip in the form of back EMF amplitude and/or width.

The control circuitry of this invention can be of a simple, straightforward design, satisfying requirements of being inherently compact and relatively inexpensive, and at the same time avoiding energy waste.

The above and many other objects, features, and advantages of this invention will become apparent from the ensuing description of a preferred embodiment, which should be read in conjunction with the accompanying Drawing.

DETAILED DESCRIPTION OF THE PREFERRED EMBODIMENT

Figure 1:
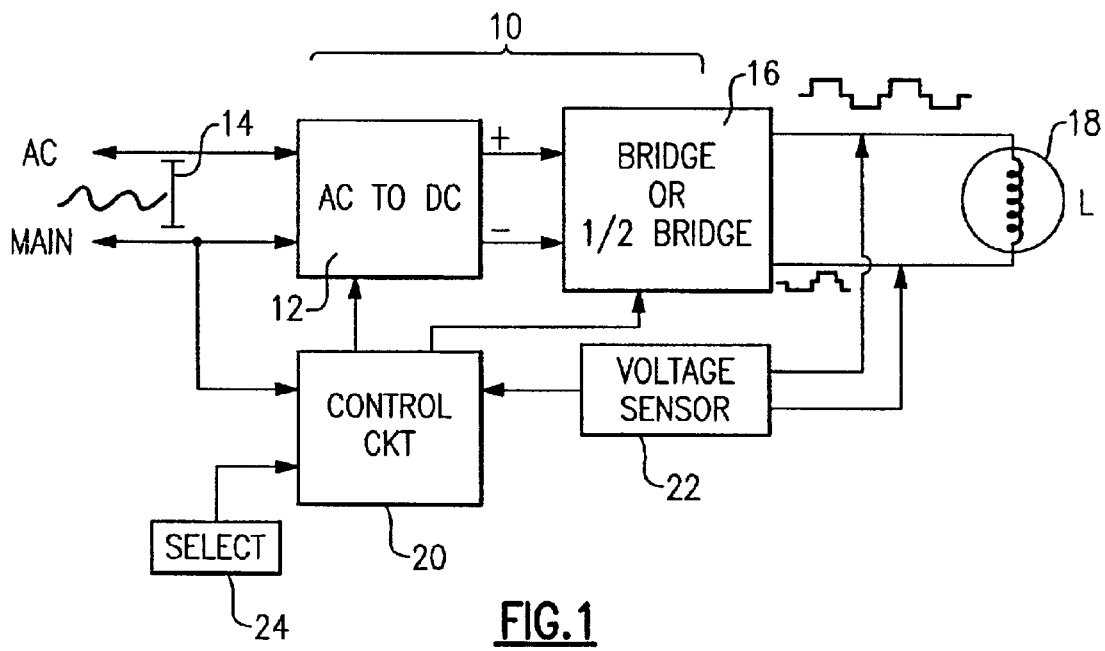
FIG. 1 is a schematic circuit diagram of a motor drive and control circuit according to one of many possible embodiments of this invention.

With reference to the Drawing, FIG. 1 is a basic schematic view of a motor drive circuit 10 employing the general concepts of this invention, and receiving AC line power from a source and then conditioning it and applying it to a load. Here, the drive circuit 10 has an AC to DC controlled rectification stage 12, with AC line inputs 14 coupled to receive AC input line power. The controlled rectification stage 12 supplies rectified power at a controlled level to an inverter stage 16, which provides an AC drive waveform to a load 18. Here, the load 18 can be the armature of a single phase induction motor. A control circuit 20 supplies control signals to the controlled rectification stage 12 and the inverter stage 16 to control the amplitude and the pulse duration and frequency of the drive waveform. A voltage sensor circuit 22 detects the voltage across the armature of the load 18, and the control circuit has an input coupled to the voltage sensor circuit 22, an input connected to the AC line input 14, and an input connected to a customer select device 24, which can be, for example, a wall thermostat which permits the customer to select fan speed, cooling or heating level, humidity control level, or the like. There may also be an input connected with an automated device that is intended to control motor speed in accordance with one or more environmental criteria (such as humidity or temperature).

The output drive wave can be in the form of alternating positive and negative square wave pulses, with brief OFF (or zero-volt) segments between them. Within the controlled rectification phase there may be storage capacitors that can be kept charged at a desired level between zero and peak AC voltage (which may be up to 140% of the average or RMS line voltage). In this case, the load 18 can favorably be the armature of a single phase induction motor; however, this drive circuitry may be applied with other types of loads, including non-rotating inductive or reactive loads.

Figure 2:
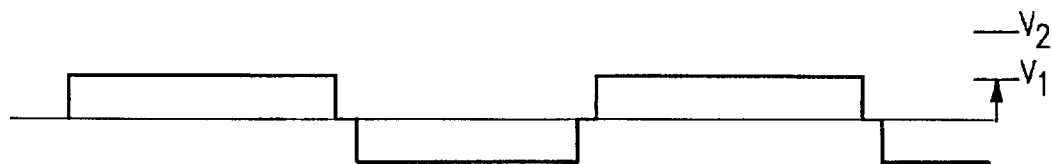
FIGS. 2 and 3 are waveforms of voltage applied to the AC load, for explaining the operation of this invention.
Figure 3:
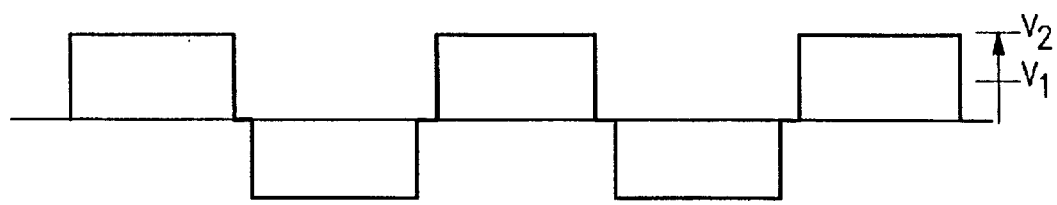

The AC input voltage from the AC line source appears on the AC input conductors 12 as a sinusoidal wave (not shown) with a nominal frequency at 60 Hz, and with a peak voltage $V_{AC}$ of 330 volts (220 volts RMS). During brown-out conditions, i.e., the peak value drops well below 330 volts, e.g., down to 285 volts (e.g., 190 volts RMS). However, by creating the output wave as generally rectangular pulses rather than sinusoidal, the average applied voltage is above the normal RMS value of the applied voltage, and the motor can be operated safely at what is typically considered a brown-out level. The output power can be line-synchronized, or can be provided at a higher or lower frequency than line frequency. The level of the rail voltage provided by the rectification stage 12 can be controlled, e.g., by controlling pick-off voltage for switching on or off an active device such as a triac or controlled rectifier within that stage 12.

Where lower speed motor operation is desired, e.g., for running a air-conditioner blower motor during a dehumidification operation, then the circuit 10 can produce drive waveforms as shown, e.g., in FIG. 2, in with longer pulses at a lower voltage $V_1$. If higher speed operation is needed, the circuit 10 produces the drive waveform as pulses of a shorter duration (higher 10 frequency) and at a correspondingly higher voltage $V_2$, as shown in FIG. 3. As shown here in both FIG. 2 and FIG. 3, there is a brief OFF interval between the forward and reverse pulses. This precludes the upper and lower switching transistors of the inverter stage 16 from both being turned on at the same time, which would result in a short between the DC rails. Therefore, just prior to the onset of each drive pulse there is a time when the voltage across the armature of the load 18 is determined by residual voltage within the device, e.g., the reverse EMF that is caused by the turning of the rotor.

Figure 4:
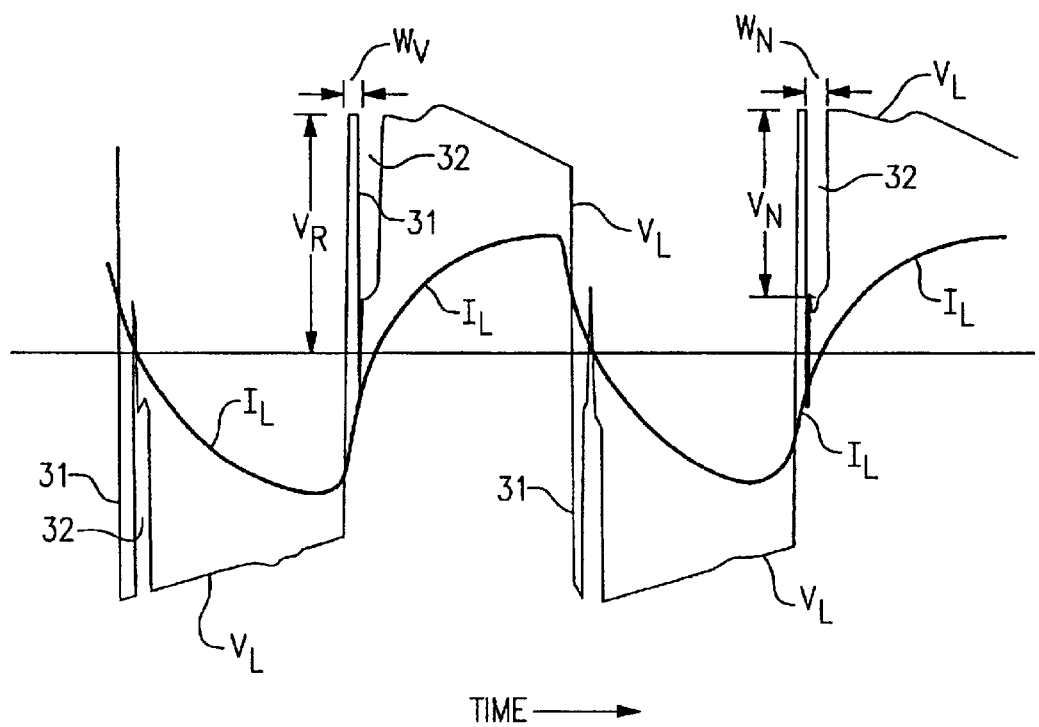
FIG. 4 are voltage waveforms of armature voltage $V_L$ and armature current $I_L$, for explaining this invention.

FIG. 4 represents an oscilloscope trace of load current $I_L$ and load voltage $V_L$ where the drive wave developed according to this invention is applied to the field winding of an AC induction motor, e.g., as the pulse drive wave shown in FIG. 3. The square wave applied to the inductive winding produces a curved sawtooth waveform as the load current $I_L$, and the load voltage $V_L$ has a generally square waveform with an initial pulse and then a notch just after transition. The real-axis power, which is the integral of the load voltage times load current, is maximized. This effect results from the odd harmonics (especially the third and fifth harmonics) of the power wave interfering constructively during the brief OFF interval of the drive wave (see FIGS. 2 and 3). The square drive wave is also a higher torque waveform, and reduces motor slip and reduces $I^2R$ losses (which result in waste heat). Reduced slip results in an increased power factor, approaching 98 percent under load conditions.

Figure 5A:
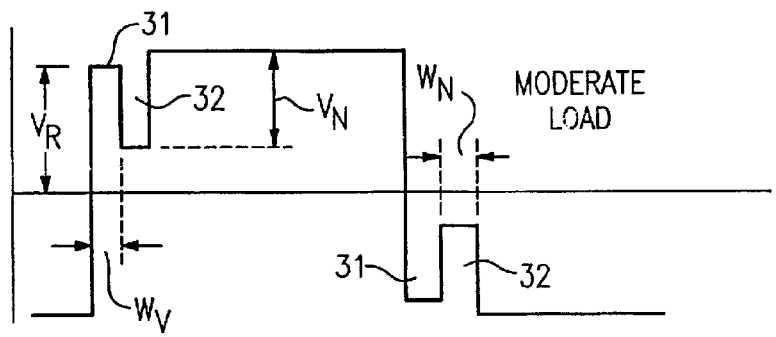
FIGS. 5A to 5E are voltage waveform charts for explaining operation of this invention under various load condition.
Figure 5B:
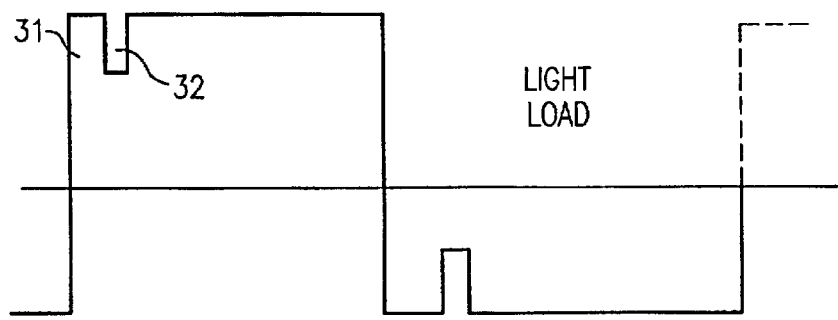

At the commencement of each half cycle, there is a buffer period during which no current is applied. Because the rotor is magnetized and is rotating, a reverse voltage is generated, and this is imposed on the armature. This reverse EMF is affected by any rotor slippage. As illustrated in FIG. 4, in the case of a moderate load ( as illustrated in FIG. 5A below), there is a forward voltage spike or pulse 31, followed by a notch 32. The height $V_R$ and duration $W_V$ of the voltage pulse 31, and the depth $V_N$ and width $W_N$ of the notch 32 vary with rotor speed and with the load imposed on the rotor. The voltage sensor 22 can be synchronized to measure any of these quantities $V_R$, $W_V$, $V_N$, or $W_N$, or several, or all of them.

The motor drive circuit of this invention can be adapted to drive higher load devices, such as air conditioning compressors. In such case the compressors can be driven at variable speeds, even where the compressor was designed for single speed operation. This permits the compressor capacity to change gracefully with the cooling load. Also the possibility of lower speed operation reduces the amount of ON-OFF cycling that is typical of present-day HVAC equipment.

The ability of this circuit to provide power of various frequencies means that with this rather simple circuit, there could be any number of drive speeds from very low speed to full speed, and even an above-normal speed. Moreover, the motor drive could be infinitely variable. With this arrangement the speed control circuit to be constructed out of smaller, and less expensive devices, which operate at very low power.

Figure 5C:
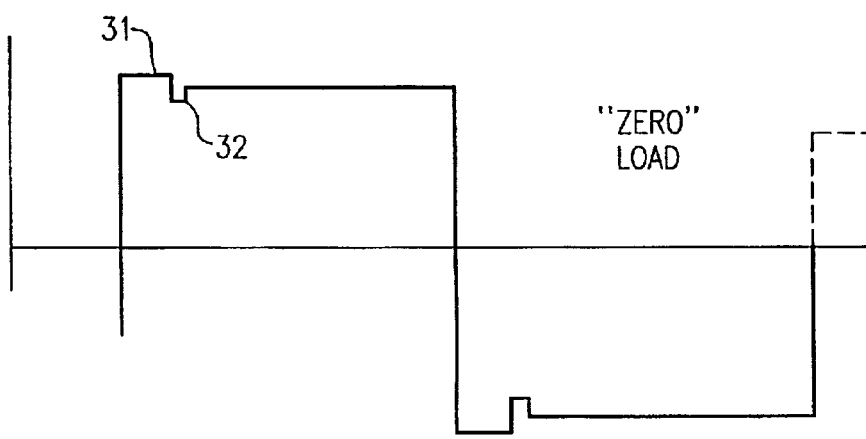
Figure 5D:
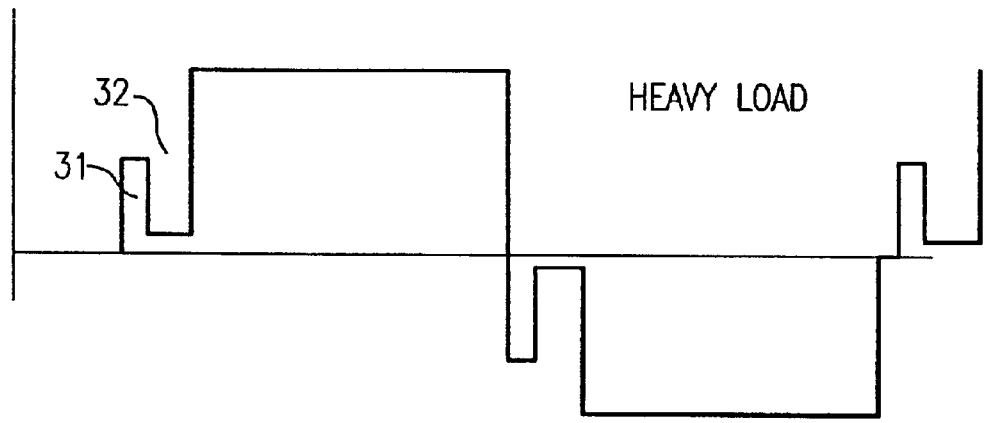
Figure 5E:
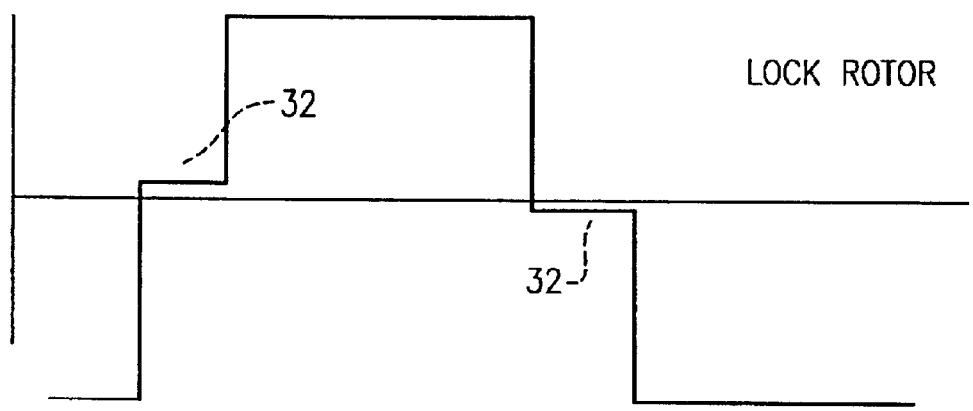

The direct motor speed detecting feature of this invention can be explained with reference to FIGS. 5A to 5E. In each of these, the applied voltage across the motor armature is shown on the vertical axis, and time on the horizontal axis. The current is applied, for example, as positive and negative pulses, with a brief OFF period or space between negative and positive regions. After start up, if the motor is turning normally, with a moderate load, the armature voltage will appear generally as shown in FIG. 5A, with a nominal reverse voltage (or reverse emf) pulse 31 and nominal notch 32. For a light load (FIG. 5B), the voltage pulse 31 is bigger, i.e., taller and somewhat wider, and the notch 32 is shallower and narrower. At the limit of zero motor load (as shown in FIG. 5C), i.e., in which the rotor spins freely, the initial pulse 31 is a maximum and the notch 32 is a minimum. For larger and larger loads, the pulse 31 becomes narrower and shorter, while the notch 32 becomes wider and deeper. FIG. 5D illustrates the armature voltage waveform under heavy load conditions, with a relatively small pulse 31 and a large notch 32. At the extreme of infinite load, i.e. rotor lock, where there is no rotation (as shown in FIG. 5E), the pulse 31 is absent at the beginning of the half cycle. This characteristic, i.e., the height (i.e., peak voltage) $V_R$ and width $W_V$ of the pulse 31 or the depth $V_N$ and width $W_N$ of the notch 32, can be sensed and measured at the beginning of each half cycle, or at selected half cycles, to gauge the load imposed on the motor and to read directly the rotation speed of the rotor. Then, the amplitude and shape of the power wave can be controlled to optimize motor operation under a multitude of load conditions.

Figure 6:
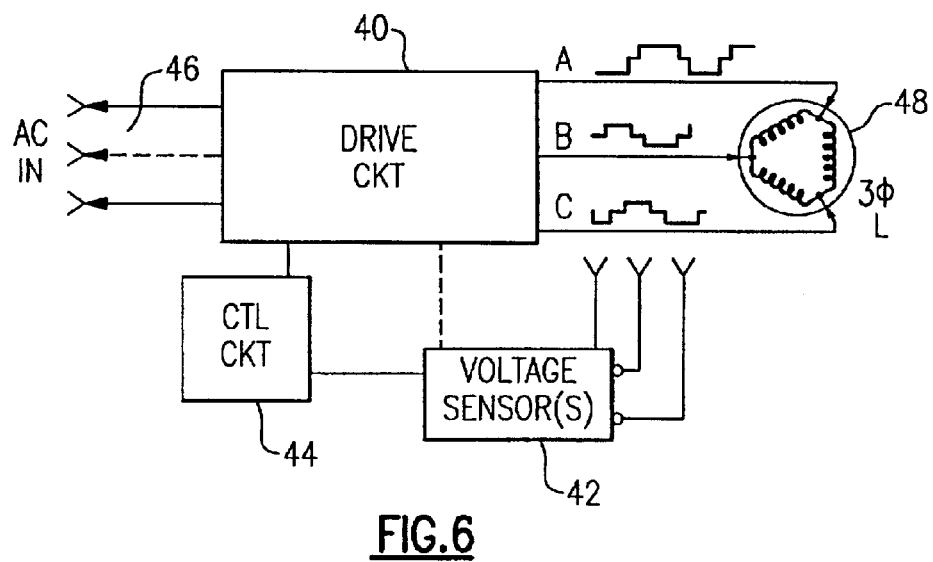
FIG. 6 is a circuit diagram another embodiment of the present invention.

A polyphase, i.e., three-phase, version of this embodiment is illustrated in FIG. 6, in which there is a three-phase drive circuit 40, for example having three switched bridges with 10 respective outputs as the three phases, here indicated as A, B, and C. There is a voltage sensor circuit 42 with inputs connected to each of the three output phases, and a control circuit 44 having a voltage sensor output arriving from the voltage sensor 42, and one or more outputs going to the drive circuit 40. The drive circuit has a power input 46 which can receive three-phase AC input power or, if none is available, can be driven from a single-phase line source. An output load 48, here shown as a three-phase induction motor is connected to the three output phases. Here, each phase is in the form of alternating forward and reverse pulses, separated by brief OFF intervals. The phases A, B, C are at mutually staggered phases, i.e., at 120 degrees phase separation. This view is indicated generally to encompass either a delta or wye arrangement. Many variations are possible.

While the invention has been described in detail with reference to certain preferred embodiments, it should be understood that the invention is not limited to those precise embodiments. Rather, many modifications and variations would present themselves to persons skilled in the art without departure from the scope and spirit of the invention, as defined in the appended claims.

I claim:

1. A method of controlling pulsed power that is being supplied to a load wherein the pulsed power has a waveform in which power segments are separated by off segments between an end of each said power segment and a commencement of a succeeding said power segment, and wherein said waveform is applied across a pair of load conductors and said load produces a reverse emf pulse on said load conductors at the commencement of at least certain ones of the power segments, comprising:

(a) detecting, between said load conductors during application thereto of said waveform, the magnitude of the reverse emf pulse at the commencement of at least certain ones of said power segments; and (b) adjusting the applied pulsed power being applied to the load based on the detected magnitude of the reverse emf pulse.

2. The method according to claim 1 wherein said detecting the magnitude includes detecting the peak voltage of said reverse emf pulse.

3. The method according to claim 2 wherein said detecting the magnitude includes detecting the width of said reverse emf pulse.

4. A method of controlling pulsed power that is supplied to a load wherein the pulsed power has a waveform in which power segments are separated by off segments between an end of each said power segment and a commencement of a succeeding said power segment, and wherein said load produces a reverse emf pulse at the commencement of at least certain ones of the power segments such that there is a notch defined between the reverse emf pulse and the following power segment, comprising:

(a) detecting the magnitude of the notch between the reverse emf pulse and the associated power segment; and (b) adjusting the applied power being applied to the load based on the detected magnitude of said notch.

5. The method according to claim 4 wherein said detecting the magnitude includes detecting the voltage depth of said notch.

6. The method according to claim 4 wherein said detecting the magnitude includes detecting the width of said notch.

7. The method according to claim 1 wherein said waveform is an AC power waveform wherein the power segments include positive and negative power segments with said off segments appearing between successive ones of said power segments.

8. The method according to claim 4 wherein said waveform is an AC power waveform wherein the power segments include positive and negative power segments with said off segments appearing between successive ones of said power segments.

* * * * *